United States Patent [19]

Roberts

[11] Patent Number: 5,368,742
[45] Date of Patent: Nov. 29, 1994

[54] METHOD OF REMOVING TOXIC RESIN ACIDS AND FATTY ACIDS FROM PULP AND PAPER EFFLUENT AND OTHER STREAMS

[75] Inventor: Brian G. Roberts, Tantallon, Canada

[73] Assignee: B. G. Roberts Chemicals Inc., Tantallon, Canada

[21] Appl. No.: 69,548

[22] Filed: Jun. 1, 1993

[51] Int. Cl.$^5$ ............................................. C02F 1/56
[52] U.S. Cl. ................................. 210/727; 162/189; 210/728; 210/730; 210/734; 210/735; 210/928
[58] Field of Search ................ 162/189; 210/705, 712, 210/725, 727, 728, 730, 734, 735, 737, 928

[56] References Cited

U.S. PATENT DOCUMENTS

| | | |
|---|---|---|
| 2,937,143 | 5/1960 | Goren ................................. 210/730 |
| 3,377,274 | 4/1968 | Burke et al. .......................... 210/53 |
| 3,627,680 | 12/1971 | Desbos ................................. 210/730 |
| 4,089,780 | 5/1978 | Svarz et al. . | |
| 4,536,294 | 8/1985 | Guillet et al. . | |
| 4,565,635 | 1/1986 | LeDu et al. ......................... 210/730 |
| 4,738,750 | 4/1988 | Ackel . | |
| 5,178,770 | 1/1993 | Chung ................................. 210/705 |

FOREIGN PATENT DOCUMENTS

| | | |
|---|---|---|
| 2023735 | 8/1990 | Canada . |
| 1288532 | 9/1991 | Canada . |
| 321989 | 6/1989 | European Pat. Off. . |
| 0529865A1 | 11/1992 | European Pat. Off. . |
| 55-035965 | 3/1980 | Japan . |
| 56-002884 | 1/1981 | Japan . |
| 58-081698 | 5/1983 | Japan . |
| 58-216777 | 12/1983 | Japan . |
| 63-034797 | 7/1988 | Japan . |
| 773716 | 5/1957 | United Kingdom . |
| 245671 | 4/1977 | U.S.S.R. . |
| 1375567 | 2/1988 | U.S.S.R. . |

Primary Examiner—Peter A. Hruskoci
Attorney, Agent, or Firm—Robert M. Phipps

[57] ABSTRACT

A method is described for improving the removal of toxic resin acids and fatty acids from pulp and paper effluent and from other streams containing resins and fatty acids. The addition of an anionic material, such as albumin, gelatin, alginate or alginic acid prior to clarification with conventional or state of the art cationic coagulation clarification or retention will improve the removal of resin acids and fatty acids.

11 Claims, 1 Drawing Sheet

METHOD OF REMOVING TOXIC RESIN ACIDS AND FATTY ACIDS FROM PULP AND PAPER EFFLUENT AND OTHER STREAMS

FIELD OF THE INVENTION

This invention relates to the use of an anionic material as a pretreatment step for improving the removal of resin acids and fatty acids from waste waters. More specifically this invention relates to the use of albumin, gelatin, alginate or alginic acid as a pretreatment step for improving the removal of resin acids and fatty acids from waste waters, wherein the alginate or alginic acid is preferred.

BACKGROUND AND PRIOR ART

Traditionally resin and fatty acids which naturally occur in various forms during the manufacturing of pulp and paper products, provide objectionable features to these processes and effluent waters. Historically, many chemical and mechanical methods have been used to remove, bind or inactivate these compounds. One such example of a method for treating pulp and paper waste water is found in U.S. Pat. No. 4,738,750 which discloses the use of a polyamine coagulant which coagulates lignins, degraded sugars and other compounds which typically discolour the waste water. The coagulation particles are increased in size by the addition of an acrylamide polymer. The flocculated material is then removed from the waste water. The use of acrylamides in effluent flocculation is also disclosed in U.S. Pat. No. 4,536,294.

U.S. Pat. No. 4,089,780 discloses a method for removing colour from pulp and paper waste waters by first treating the waste water with a cationic water-soluble polyamine and thereafter adding a suitable organic co-agulating polymer.

The specific problem of removing toxic resin and fatty acids from the waste water of a pulp and paper mill has been addressed in Canadian Patent Application 2,023,735. The process, of this patent application, utilizes a composition comprising a water-soluble non-ionic polyalkylene ether containing lower alkyl groups in the alkyl chain and an ionic water-soluble polymer. However, the results achieved by this method show, at the very best, a 37% removal of the resin acid after treatment. In order to be an effective waste water treatment process, improved results over that shown in the prior art must be achieved.

SUMMARY OF INVENTION

Thus according to the present invention there is provided a method of removing toxic resin acids and fatty acids from pulp and paper effluent and other streams containing resins acids and fatty acids. According to the method of the present invention, an anionic material is added to the waste water prior to clarification with conventional cationic polymers. According to the method of the present invention the anionic material is selected from gelatin, albumin and alginate, wherein the alginate is preferred.

In one embodiment of the present invention there is provided a method of purifying waste water containing resin acids and fatty acids comprising adding an effective amount of an alginate, in a metallic salt form or acid form thereof, to the waste water and then adding a cationic polymer to coagulate or flocculate the complexed alginate and resin acids and fatty acids, and separate the resultant precipitate, thus reducing the concentration of the resin and fatty acids in the waste waters.

This invention is also directed to a composition for treating waste waters containing resin acids and fatty acids comprising an anionic material, selected from the group consisting of gelatin, albumin, or an alginate, in a metallic salt form or acid form thereof, and a cationic polymer.

DETAILED DESCRIPTION OF THE INVENTION

Figure 1:
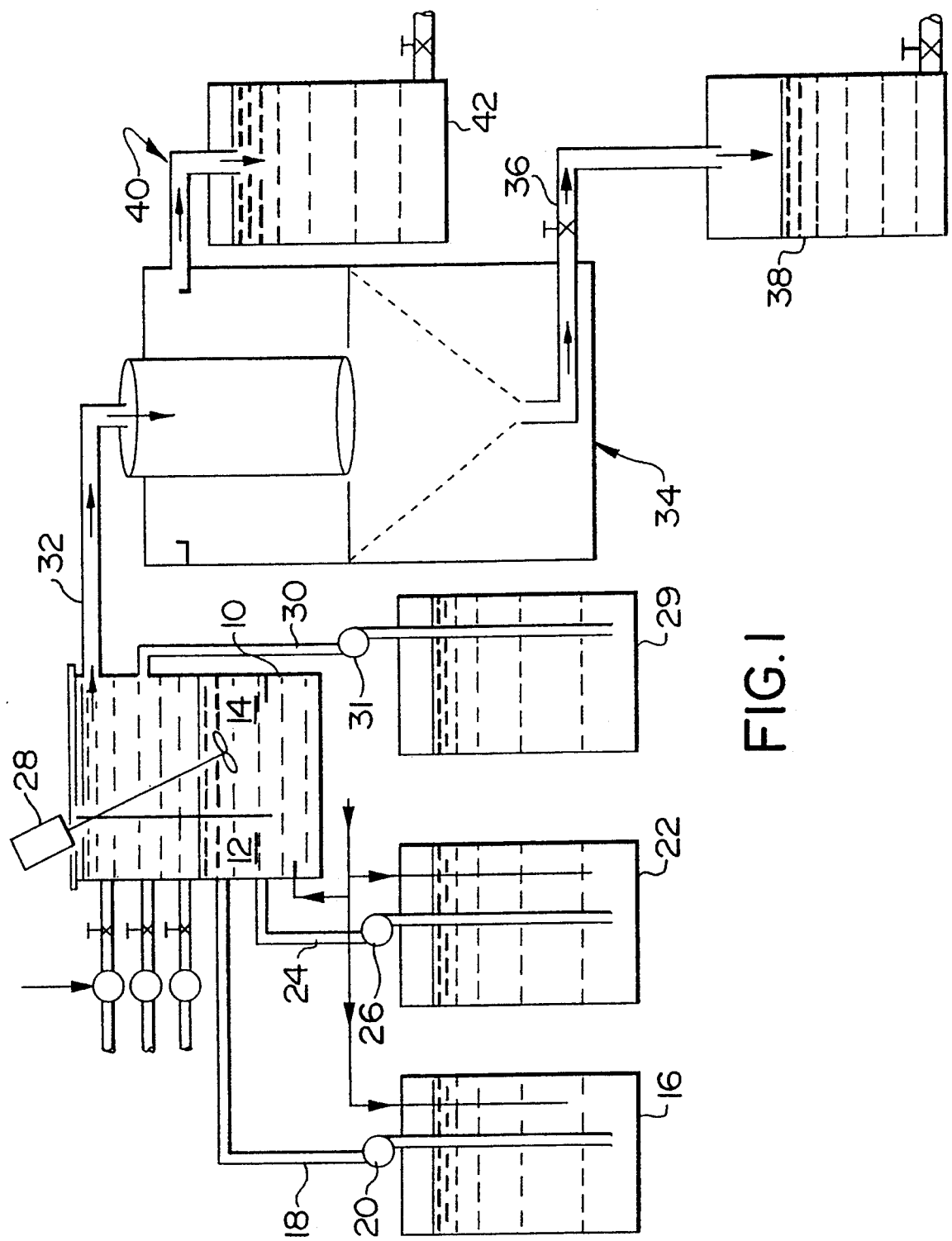
FIG. 1 shows a schematic of a pilot plant suitable for the treatment of waste water according to the present invention.

According to the present invention, there is provided a method of improving the removal of resin acids and fatty acids from waste water. This method comprises the addition of an anionic material to the waste water prior to treatment with conventional cationic polymers.

The present invention is based on the discovery that pre-treatment of the waste water with an anionic material improves the removal of resin acids or fatty acids from the waste stream. Prior art treatments which generally rely on the use of a cationic polymer, either alone or together with other compounds, show variable reported results. However, the average prior art methods of removal of contaminants from the waste streams are within the range of 30–60%. According to one embodiment of the present invention, the addition of an alginate prior to clarification with conventional cationic polymers improves the removal of resin acids up to 98% and the removal of fatty acids up to 94%.

This invention is particularly applicable to pulp and paper waste water treatment, however, it can also be used for the treatment of any waste stream for the removal of resin acids and fatty acids.

The anionic material of the present invention is selected from the group consisting of gelatin, albumin or alginate, wherein the alginates are preferred. The alginates according to the present invention can be present in one of its metallic salt forms or acid forms. Various gelatins, albumins or alginates of different molecular weights can be used according to the present invention. Representative examples of alginates which can be used according to the present invention include alginic acid and sodium alginate, potassium alginate or magnesium alginate. The alginate is prepared for convenience as a 1% solution, preferably a 1% sodium alginate solution. In order to aid the affinity of the alginate for the resin acid or fatty acid material, in some cases an acid was added to acidify the alginate. Any type of acid would be appropriate, but for convenience and for economic reasons, sulphuric acid was used for this purpose. In one example of the invention, a 0.5 ml of concentrated sulphuric acid was added per 100 ml of 1% solution of sodium alginate to acidify the sodium alginate. Not to be bound by any particular theory, it is thought that the acidified alginate in slightly hydrophobic and as such has a greater affinity for the hydrophobic resin and fatty acids.

A suitable dose of gelatin, albumin or alginate, for the precipitation of resin acids and fatty acids from waste waters, ranges from 4 ppm to 250 ppm, preferably from 5 ppm to 50 ppm. In general the amount of anionic material to be added to the waste water is determined empirically for each different type of waste stream to be treated. In general a dose of 50 ppm will in most circumstances be adequate, but it is within the skill of one in the art to vary the concentration according to the need.

The anionic material is first added to the waste water to be treated for a minimum contact time of 20 seconds before the addition of a cationic material. The resin acids-fatty acids/anionic material complex is quite stable and thus can remained complexed, before the addition of cationic material for long periods of time without adverse effect. A wide range of cationic materials have been used in the prior art and are considered to be within the scope of the present invention. For example, a number of cationic materials are defined in U.S. Pat. No. 3,377,274 (incorporated herein by reference). Some examples of usable cationic materials include polyamines, polyacrylamides, acrylamide copolymers, diallyl dimethylammonium chloride, cationic condensate polymer sold under the tradename DEC 50 (Floerger).

The cationic polymers are used according to the present invention for the removal of the anionic material which is bound to the resin acids and fatty acids. As with the anionic material the amount of cationic polymer added to flocculate or precipitate the contaminating materials will vary depending on the waste water to be treated. In the examples provided herein the amount of polyacrylamide ranged from 5 ppm to 75 ppm, preferably ranging from 5 ppm to 50 ppm. When a polyamine was used in conjunction with the polyacrylamide the range of the polyamine was from 10 ppm to 300 ppm, preferably from 10 ppm to 100 ppm.

In general the process of the present invention can be used with conventional waste water treatment processes and facilities already in place such as primary sedimentation and filtration. If additional facilities are required, a treatment plant as depicted in FIG. 1, could be used according to the present invention.

In all of the examples described herein, samples of waste water were taken from various pulp and paper mills and subjected to the treatment according to the present invention using either a small scale laboratory treatment facility, a pilot plant as shown in FIG. 1 or a similar treatment system. The primary mixing tank 10 comprises two zones, zone 1, 12, and zone 2, 14. The anionic material, for example alginate is added to zone 1 of the primary mixing tank 10, from a first chemical feed tank 16, fed from the tank to the primary mixing tank by conventional means, through feed line 18 and pulping means 20. The effluent is pumped, by conventional means, directly from the pulp and paper plant or other industrial plant or from a storage holding facility into the primary mixing tank 10 initially into zone 1, 12. After an initial mixing of the effluent with the alginate, with a minimum contact time of 20 seconds, cationic material is added to flocculate and clarify the effluent waste stream. If a low molecular weight cationic material such as a polyamine is to be added to the primary mixer, it is added from a second chemical feed tank 22, the low molecular cationic material being fed into zone 1, 12, of the primary mixing tank 10 by conventional feed lines 24 and pumping means 26. A high molecular weight cationic material, for example polyacrylamide, is then added to zone 2, 14, of the primary mixing tank 10 and communicated with the pretreated effluent by way of a mixing means 28. A third chemical feed tank 29, containing the high molecular weight cationic material communicates with zone 2, 14, by conventional feed lines 30 and pumping means 31. The contents of zone 1 and 2 are in direct communication with each other as there is no separation between the two zones at the lower end of zone 2.

Following the polyacrylamide's coagulation of the waste materials from the effluent, the treated material is removed from the primary mixing tank by conventional means through feed line 32 and added to a clarifier referred to generally by reference numeral 34. The clarifier provides means of separating the treated effluent from the coagulated material or sludge. The treated effluent is held in the clarifying tank for 60 to 120 minutes to facilitate the settling of the coagulated material. This material is then removed by conventional means through feed line 36 into a sludge tank 38. Mechanical methods for removing the coagulated resins and fatty acids could include primary settling or floatation such as sludge blanket clarification, foam or froth floatation, dissolved or induced air floatation. The clarified effluent is also removed by conventional means through feed line 40 to the final effluent tank 42.

Flow rate of the effluent, in the pilot plant described above, is 6 to 8 gallons per minute.

The examples which follow illustrate typical results for treatment of waste waters using the present invention and are not to be construed as limiting. The waste water samples were taken from local pulp and paper plants. Standard techniques were used for the chemical analyses of the treated and untreated effluent.

EXAMPLE 1

The waste water sample was from the Bowater Paper Machine and Spill Tank. The sample was treated by first adding acidified sodium alginate at a dose of 50 ppm followed by the addition of polyacrylamide at 25 ppm. Chemical analysis of the fatty acids remaining in the effluent after treatment showed a 94.4 percent reduction in fatty acids, when compared to the untreated effluent, as shown below in Table 1.

TABLE 1

| Fatty acid analysis before and after effluent treatment | | |
|---|---|---|
| Fatty Acid | Treated Effluent | Untreated Effluent |
| Palmitic Acid | 50 | 655 |
| Oleic Acid | 175 | 2940 |
| Linoleic Acid | 360 | 6840 |
| Linolenic Acid | 23 | 343 |
| Totals | 608 | 10780 |

Percent Fatty Acid Reduction 94.4%

Table 2 shows the results of the resin acid concentration in the untreated effluent and concentration of resin acids after treatment, according to the present invention. The results demonstrate a 96% reduction in the total resin acid concentration.

TABLE 2

| Resin Acid Analysis before and after effluent treatment | | |
|---|---|---|
| Resin Acid | Treated Effluent | Untreated Effluent |
| Pimaric Acid | 56 | 800 |
| Sandaracopimaric | 127 | 2610 |
| Neoabietic | 22 | 3810 |
| Dehydroabietic | 510 | 8660 |
| Abietic | 720 | 14430 |
| Palustric | 34 | 5010 |
| Isopimaric | 256 | 5480 |
| Totals | 1730 | 40800 |

Percent Resin Acid Reduction 96%

EXAMPLE 2

In this example, samples were taken from Canadian Key Fibres Sewer number 1 and number 2 and treated according to the protocol discussed above. In this example, alginate was added at a dose of 250 ppm followed by the addition of polyacrylamide at a dose of 10 ppm. Resin acid concentrations, before and after treatment, are shown below in Tables 3 and 4 for the samples obtained from sewer 1 and 2, respectively. The percent reduction in fatty acid concentration was not determined in this Example.

TABLE 3

Resin Acid Analysis of untreated and treated effluent from sewer #1

| Resin Acid | Treated Effluent | Untreated Effluent |
| --- | --- | --- |
| Pimaric Acid | 6 | 142 |
| Sandaracopimaric | 8 | 123 |
| Neoabietic | 9 | 101 |
| Dehydroabietic | 80 | 3090 |
| Abietic | 55 | 1110 |
| Palustric | 16 | 223 |
| Isopimaric | 31 | 289 |
| Totals | 205 | 5080 |

Percent Resin Acid Reduction 96%

TABLE 4

Resin Acid Analysis of untreated and treated effluent from sewer #2

| Resin Acid | Treated Effluent | Untreated Effluent |
| --- | --- | --- |
| Pimaric Acid | 4 | 121 |
| Sandaracopimaric | 5 | 91 |
| Neoabietic | 3 | 58 |
| Dehydroabietic | 55 | 1580 |
| Abietic | 26 | 750 |
| Palustric | 4 | 148 |
| Isopimaric | 13 | 228 |
| Totals | 110 | 2980 |

Percent Resin Acid Reduction 96.3%

EXAMPLE 3

In this example, waste water was obtained from Bowater TMP Pressate and Wash Water. Duplicate samples were obtained. Each sample was further subdivided eight times and varying concentrations of alginate, 19 ppm or 50 ppm, polyamine, 40 ppm or 100 ppm, and polyacrylamide, 50 ppm or 75 ppm, were added. The percent reduction of fatty acids ranged from 62% to 96%. The percent reduction of resin acids ranged from 68% to 98%. Four samples, run 1-8, run 2-8, run 1-6 and run 2-6 are described in more detail. The dosage for these four samples was as follows. For run 1-8 and run 2-8, alginate was added at a dose of 50 ppm, which was followed by treatment with the low molecular weight cationic polymer polyamine at a does of 100 ppm, which was then in turn followed by the addition of polyacrylamide at a dose rate of 75 ppm. For run 1-6 and run 2-6, the effluent was treated first with alginate at a dose of 19 ppm followed by polyamine at 100 ppm and polyacrylamide at 75 ppm. The results from these tests are shown in tables, which follow. Table 5 shows the resin acid analysis of the treated effluent and the untreated effluent from run 1-6, demonstrating a 93.3% removal of resin acids.

TABLE 5

Resin Acid Analysis of treated and untreated effluent from run 1-6

| Resin Acid | Treated Effluent | Untreated Effluent |
| --- | --- | --- |
| Pimaric Acid | 222 | 2960 |
| Sandaracopimaric | 490 | 6360 |
| Neoabietic | 947 | 9540 |
| Dehydroabietic | 1210 | 8450 |
| Abietic | 1950 | 46530 |
| Palustric | 1406 | 17090 |
| Isopimaric | 864 | 14740 |
| Totals | 7090 | 105670 |

Percent Resin Acid Reduction 93.3%

Table 6 shows the fatty acid analysis of the untreated and treated effluent of the same sample (run 1-6) demonstrating an 85.7% removal of fatty acids.

TABLE 6

Fatty Acid Analysis of treated and untreated effluent from run 1-6

| Fatty Acid | Treated Effluent | Untreated Effluent |
| --- | --- | --- |
| Palmitic Acid | 70 | 450 |
| Oleic Acid | 217 | 1780 |
| Linoleic Acid | 435 | 2780 |
| Linolenic Acid | 45 | 337 |
| Totals | 767 | 5350 |

Percent Fatty Acid Reduction 85.7%

Table 7, shows the resin acid analysis of the untreated and treated effluent from run 1-8 demonstrating a 97% reduction of total resin acids. The corresponding fatty acid analysis from this sample is shown in Table 8, wherein the percentage of fatty acid reduction was 95.8%.

TABLE 7

Resin Acid Analysis of treated and untreated effluent from run 1-8

| Resin Acid | Treated Effluent | Untreated Effluent |
| --- | --- | --- |
| Pimaric Acid | 94 | 2960 |
| Sandaracopimaric | 235 | 6360 |
| Neoabietic | 362 | 9540 |
| Dehydroabietic | 552 | 8450 |
| Abietic | 1020 | 46530 |
| Palustric | 548 | 17090 |
| Isopimaric | 400 | 14740 |
| Totals | 3210 | 105670 |

Percent Resin Acid Reduction 97%

TABLE 8

Fatty Acid Analysis of treated and untreated effluent from run 1-8

| Fatty Acid | Treated Effluent | Untreated Effluent |
| --- | --- | --- |
| Palmitic Acid | 24 | 450 |
| Oleic Acid | 66 | 1780 |
| Linoleic Acid | 127 | 2780 |
| Linolenic Acid | 10 | 337 |
| Totals | 227 | 5350 |

Percent Fatty Acid Reduction 95.8%

Table 9 provides the results of the resin acid analysis of the treated and untreated effluent from run 2-6 and demonstrates a percent resin acid reduction of 96.5%.

TABLE 9

Resin Acid Analysis of treated and untreated effluent from run 2-6

| Resin Acid | Treated Effluent | Untreated Effluent |
| --- | --- | --- |
| Pimaric Acid | 98 | 3620 |
| Sandaracopimaric | 245 | 7590 |
| Neoabietic | 339 | 12220 |
| Dehydroabietic | 682 | 9710 |
| Abietic | 1740 | 40130 |
| Palustric | 338 | 19480 |
| Isopimaric | 438 | 18130 |
| Totals | 3930 | 110880 |

Percent Resin Acid Reduction 96.5%

Table 10 shows the corresponding fatty acid analysis, from run 2-6, which demonstrates a 92% reduction in the treated effluent according to the present invention.

TABLE 10

Fatty Acid Analysis of treated and untreated effluent from run 2-6

| Fatty Acid | Treated Effluent | Untreated Effluent |
| --- | --- | --- |
| Palmitic Acid | 34 | 470 |
| Oleic Acid | 108 | 1540 |
| Linoleic Acid | 200 | 2780 |
| Linolenic Acid | 22 | 300 |
| Totals | 364 | 5090 |

Percent Fatty Acid Reduction 92.8%

Table 11 shows the resin acid analysis of the untreated and treated effluent from run 2-8 demonstrating a 97.9% reduction of total resin acids. The corresponding fatty acid analysis from this sample is shown in Table 12, wherein the percentage of fatty acid reduction was 97%.

TABLE 11

Resin Acid Analysis of treated and untreated effluent from run 2-8

| Resin Acid | Treated Effluent | Untreated Effluent |
| --- | --- | --- |
| Pimaric Acid | 18 | 3620 |
| Sandaracopimaric | 130 | 7590 |
| Neoabietic | 260 | 12220 |
| Dehydroabietic | 371 | 9710 |
| Abietic | 888 | 40130 |
| Palustric | 386 | 19480 |
| Isopimaric | 249 | 18130 |
| Totals | 2340 | 110880 |

Percent Resin Acid Reduction 97.9%

TABLE 12

Fatty Acid Analysis of treated and untreated effluent from run 2-8

| Fatty Acid | Treated Effluent | Untreated Effluent |
| --- | --- | --- |
| Palmitic Acid | 13 | 470 |
| Oleic Acid | 37 | 1540 |
| Linoleic Acid | 96 | 2780 |
| Linolenic Acid | 12 | 300 |
| Totals | 158 | 5090 |

Percent Fatty Acid Reduction 97%

EXAMPLE 4

The effluent for this sample was the total mill effluent taken from Canexel and the sample was treated according to the pilot plant, discussed above and depicted in FIG. 1. In this example, alginate at a concentration of 50 ppm was first added to the effluent after which polyamine was added at a rate of 300 ppm followed by polyacrylamide at a rate of 47 ppm. This dosage is considered to be a full dose and was used for the analysis in sample 2 and 3 shown in Table 13, which follows. A number modifications of the concentration of chemicals used in the treatment of the Canexel mill effluent were also performed. The modifications are as follows. In sample 4, no polyacrylamide was added. Sample 5 was treated with 50% dose of the acidified sodium alginate, i.e. 25 ppm instead of the 50 ppm. Sample 7 was not treated with any alginate and was treated with a 50% reduction in the polyacrylamide. In sample 8, a 50% reduction of alginate was used. This sample therefore is similar to sample 5 noted above. Sample 9 used a 50% reduction in alginate and in polyamine.

The results shown in Table 13 provide the amount of organic material in the form of BOD (Biological Oxygen Demand), COD (Chemical Oxygen Demand), DS (Dissolved Solids), SS (Suspended Solids), and TS (Total Solids) and turbidity of an untreated sample in comparison with the sample treatments as described above. It is clear from Table 13 that a full does treatment of the compounds (alginate 50 ppm; polyamine 300 ppm; and polyacrylamide 47 ppm), as shown in sample 2 and 3, provides for a 55-61% reduction in BOD as compared to the untreated sample. These results also are interesting in that sample 7, which does not contain any alginate and only the cationic polymers, shows 35% removal of BOD demonstrating an improvement when alginate is used in a pretreatment step.

TABLE 13

Canexel Pilot Plant Trial

| Sample # (Treatment) | BOD (% removal) | COD | DS | SS | TS | Turbidity |
| --- | --- | --- | --- | --- | --- | --- |
| #1 (Untreated) | 3823 | | 7015 | 2560 | | 4000 Plus |
| #2 (Full Dose) | 1474 (61.4%) | | 5575 | 170 | | 284 |
| #3 (Full Dose) | 1700 (55.5%) | 7750 | 6560 | 170 | 6140 | 283 |
| #4 (No polyacrylamide) | 2949 (22.9%) | | 5565 | 155 | | 217 |
| #5 (50% Less alginate) | 2066 (46%) | | 5690 | 95 | | 70 |
| #7 (No alginate & 50% Less polyacrylamide) | 2830 (35%) | 8380 | 7460 | 160 | 7290 | 370 |
| #8 (50% Less alginate) | 2600 (32%) | 8600 | 6230 | 60 | 6420 | 75 |
| #9 | 1580 | 7020 | 5750 | 60 | 5520 | 53 |

TABLE 13-continued

Canexel

Pilot Plant Trial

| Sample # (Treatment) | BOD (% removal) | COD | DS | SS | TS | Turbidity |
|---|---|---|---|---|---|---|
| (50% Less alginate & polyamine) | (58.7%) | | | | | |

The results, of the analysis of resin acids and fatty acid, with sample 9, which uses a 50% dose of the alginate (i.e. 25 ppm) and a 50% dose of the polyamine (i.e. 150 ppm), are shown in Tables 14 and 15, respectively. The results are comparable with those discussed previously, wherein the resin acid is reduced by 98.4% and the fatty acid is reduced by 93.7%.

TABLE 14

Resin Acid Analysis of treated and untreated effluent from Canexel Mill

| Resin Acid | Treated Effluent | Untreated Effluent |
|---|---|---|
| Pimaric Acid | Less than 0.5 | 12 |
| Sandaracopimaric | 0.5 | 7.3 |
| Neoabietic | Less than 0.5 | 9.3 |
| Dehydroabietic | 5.1 | 266 |
| Abietic | 2.0 | 240 |
| Palustric | Less than 0.5 | Less than 0.5 |
| Isopimaric | 1.6 | 125 |
| Totals | 10.7 | 660.1 |

Percent Resin Acid Reduction 98.4%

TABLE 15

Fatty Acid Analysis of treated and untreated effluent from Canexel Mill

| Fatty Acid | Treated Effluent | Untreated Effluent |
|---|---|---|
| Palmitic Acid | 20 | 208 |
| Oleic Acid | 44 | 626 |
| Linoleic Acid | 27 | 550 |
| Linolenic Acid | Less than 0.5 | 73 |
| Totals | 91.5 | 1457 |

Percent Fatty Acid Reduction 93.7%

EXAMPLE 5

The sample for this example was taken from the effluent from Irving Paper Ltd. The sample was treated with the following chemicals: polyacrylamide, 10 ppm; polyamine, 5 ppm and gelatin 5 ppm. The results are shown below in Table 16.

TABLE 16

Analysis of treated and untreated sample

| | Untreated | Treated | % Reduction |
|---|---|---|---|
| Suspended Solids (SS) | 83.7 | 9 | 89 |
| BOD | 250 | 120 | 52 |
| Dissolved Solids (D) | 657 | 607 | 7.7 |
| COD | 625 | 382 | 39 |
| Total Solids (TS) | 717 | 606 | 15.5 |

EXAMPLE 6

In this example the sample was taken from the Bowaters Mersey Paper Co. The sample was treated as follows: polyacrylamide, 20 ppm and gelatin, 10 ppm. The results are shown below in Table 17.

TABLE 17

Analysis of treated and untreated sample

| | Untreated | Treated | % Reduction |
|---|---|---|---|
| SS | 186 | 38 | 80 |
| BOD | 550 | 130 | 76.4 |
| COD | 1020 | 520 | 49 |

EXAMPLE 7

In this example the sample was taken from the Stora Forest Industries. The sample was treated as follows: polyacrylamide, 15 ppm; polyamine, 15 ppm and gelatin, 10 ppm. The results are shown below in Table 18.

TABLE 18

Analysis of treated and untreated sample

| | Untreated | Treated | % Reduction |
|---|---|---|---|
| BOD | 938 | 430 | 54 |
| COD | 2600 | 1240 | 53 |
| SS | 97 | 10 | 90 |
| DS | 1836 | 1156 | 37 |
| TS | 2073 | 808.5 | 39 |

It is understood that the invention has been disclosed herein in connection with certain examples and embodiments. However, such changes, modifications or equivalents as can be used by those skilled in the art are intended to be included. Accordingly, the disclosure is to be construed as exemplary, rather than limiting, and such changes within the principle of the invention as are obvious to one skilled in the art are intended to be included with the scope of the claims.

The embodiments of the invention in which an exclusive property or privilege is claimed are defined as follows:

1. A process for removing resin acids and fatty acids from pulp and paper effluent comprising first adding to the effluent a sufficient amount of an anionic material selected from the group consisting of gelatin, albumin and alginate to complex said resin acids and fatty acids then adding a sufficient amount of a cationic polymer selected from the group consisting of polyamines, polyacrylamides, acrylamide copolymers, polydiallyl dimethylammonium chloride, and cationic condensate polymers to coagulate the complexed anionic material, fatty acids and resin acids in the effluent; and removing the coagulated resin acids and fatty acids from a clarified effluent.

2. A process according to claim 1, wherein the anionic material is an alginate.

3. A process according to claim 2, wherein the alginate is a sodium alginate.

4. A process of claim 3, wherein a sufficient amount of acid is added to the alginate to improve the affinity of the alginate for the resin acid and fatty acid.

5. A process according to claim 4, wherein the acid is sulphuric acid.

6. A process according to claim 5, wherein the sodium alginate is present in a range from 4 ppm to 250 ppm.

7. A process according to claim 6, wherein the cationic polymer is polyacrylamide and is present in the composition from 5 ppm to 75 ppm.

8. A process according to claim 7, wherein the cationic polymer is a polyamine present at a concentration from 10 ppm to 300 ppm.

9. A process of claim 8 wherein said cationic polymer comprises a first and second cationic polymer, wherein said first cationic polymer is a polyamine and said second cationic polymer is a polyacrylamide.

10. A process for removing resin acids and fatty acids from pulp and paper effluent comprising first adding to the effluent from 4 ppm to 250 ppm of sodium alginate, wherein a sufficient amount of acid is added to said alginate to improve the affinity of the alginate for the resin acid and fatty acid, for a minimum contact time of 20 seconds to complex the resin acids and fatty acids; then adding from 5 ppm to 300 ppm of a cationic polymer selected from the group consisting of polyamines, polyacrylamides, acrylamide copolymers polydiallyl dimethylammonium chloride, and cationic condensate polymers to coagulate the alginate/resin acids and fatty acids complex, thus reducing the fatty acid and resin acid concentration in the effluent and removing the coagulated resin acids and fatty acids from a clarified effluent.

11. A process of claim 10 wherein said cationic polymer comprises a first and second cationic polymer, wherein said first cationic polymer is a polyamine and said second cationic polymer is a polyacrylamide.

* * * * *